US008280307B2

(12) United States Patent
Talty et al.

(10) Patent No.: US 8,280,307 B2
(45) Date of Patent: Oct. 2, 2012

(54) WIRELESS ACCESS MODULE WITH INTEGRATED ANTENNA

(75) Inventors: Timothy J. Talty, Beverly Hills, MI (US); Alan T. Budyta, Grand Blanc, MI (US); Daniel L. Hart, Rochester, MI (US); Rod Niner, Royal Oak, MI (US); Duane S. Carper, Davison, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 341 days.

(21) Appl. No.: 12/686,934

(22) Filed: Jan. 13, 2010

(65) Prior Publication Data

US 2010/0202353 A1 Aug. 12, 2010

Related U.S. Application Data

(60) Provisional application No. 61/151,067, filed on Feb. 9, 2009.

(51) Int. Cl.
*H04B 7/00* (2006.01)

(52) U.S. Cl. ....................................... 455/41.2; 455/500

(58) Field of Classification Search ................. 455/41.2, 455/73, 500, 39, 90.2; 340/445, 447, 426.16
See application file for complete search history.

(56) References Cited

U.S. PATENT DOCUMENTS

| | | | | |
|---|---|---|---|---|
| 7,171,237 | B2 * | 1/2007 | Vangala | 455/557 |
| 7,492,325 | B1 * | 2/2009 | Moosbrugger et al. | 343/853 |
| 7,535,958 | B2 * | 5/2009 | Best | 375/239 |
| 7,768,457 | B2 * | 8/2010 | Pettus et al. | 343/700 MS |
| 7,908,054 | B2 * | 3/2011 | Korzin | 701/36 |
| 7,929,474 | B2 * | 4/2011 | Pettus et al. | 370/310 |
| 7,994,905 | B2 * | 8/2011 | Kukshya et al. | 340/447 |
| 2007/0279304 | A1 | 12/2007 | Chakam | |
| 2008/0094290 | A1 | 4/2008 | Wen | |
| 2010/0148986 | A1 * | 6/2010 | Aunkofer et al. | 340/825.69 |
| 2011/0188552 | A1 * | 8/2011 | Yoon et al. | 375/219 |

FOREIGN PATENT DOCUMENTS

DE 10 2007 034 058 A1 2/2009

* cited by examiner

*Primary Examiner* — Sonny Trinh

(74) *Attorney, Agent, or Firm* — John A. Miller; Miller IP Group, PLC

(57) ABSTRACT

An integrated wireless antenna/transceiver module that has particular application for use on a vehicle. The module includes a plurality of antenna radiating elements integrated on a circuit board where a separate radiating element is typically provided for each wireless application desirable for the particular vehicle. The module further includes a separate transceiver integrated on the circuit board where each transceiver is electrically coupled to a particular radiating element. Each of the transceivers is also electrically coupled to a local area network hub that receives signals from the transceiver, where the hub multiplexes the signals onto a digital interface to be sent to the particular application in the vehicle.

17 Claims, 2 Drawing Sheets

WIRELESS ACCESS MODULE WITH INTEGRATED ANTENNA

CROSS REFERENCE TO RELATED APPLICATIONS

This application claims the benefit of the priority date of U.S. Provisional Patent Application No. 61/151,067, titled Wireless Access Module With Integrated Antenna, filed Feb. 9, 2009.

BACKGROUND OF THE INVENTION

1. Field of the Invention

This invention relates generally to an integrated wireless antenna/transceiver module and, more particularly, to an integrated wireless antenna/transceiver module that includes a plurality of antenna radiating elements and transceivers integrated into a common module on a circuit board, where the module is positioned between a vehicle roof and headliner.

2. Discussion of the Related Art

Modern vehicles employ various types of antennas to receive and transmit signals for different systems, such as terrestrial radio, cellular telephone, satellite radio, GPS, etc. Typically, the antennas for these different reception applications are integrated into a single chassis that is mounted to the roof of the vehicle at a desirable location. Transceivers associated with the various applications are distributed throughout the vehicle at certain locations depending on the particular vehicle design. The transceivers are electrically coupled to their respective antenna radiating element and the integrated antenna chassis by a coaxial cable that runs through the vehicle along support structures in an aesthetically pleasing and supportive manner.

The number of wireless vehicle applications that require an antenna is increasing and in the near future may include many other systems, such as Bluetooth (BT), WiFi, dedicated short range communication (DSRC), etc. The length of the coaxial cable required to connect the antenna to the transceiver for each application may be as long as 18 feet, thus requiring significant expense for each vehicle. Further, the losses associated with using coaxial cables are significant, typically on the order of 7 dB, which increases the size and cost of the antenna radiating element because of the increase required in antenna gain to compensate for these losses.

SUMMARY OF THE INVENTION

In accordance with the teachings of the present invention, an integrated wireless antenna/transceiver module is disclosed that has particular application for use on a vehicle. The module includes a plurality of antenna radiating elements integrated on a circuit board where a separate radiating element is typically provided for each wireless application desirable for the particular vehicle. The module further includes a separate transceiver integrated on the circuit board where each transceiver is electrically coupled to a particular radiating element. Each of the transceivers is also electrically coupled to a local area network hub that receives signals from the transceiver, where the hub multiplexes the signals onto a digital interface to be sent to the particular application in the vehicle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an integrated wireless antenna/transceiver module for a vehicle is merely exemplary in nature, and is in no way intended to limit the invention or its applications or uses.

Figure 1:
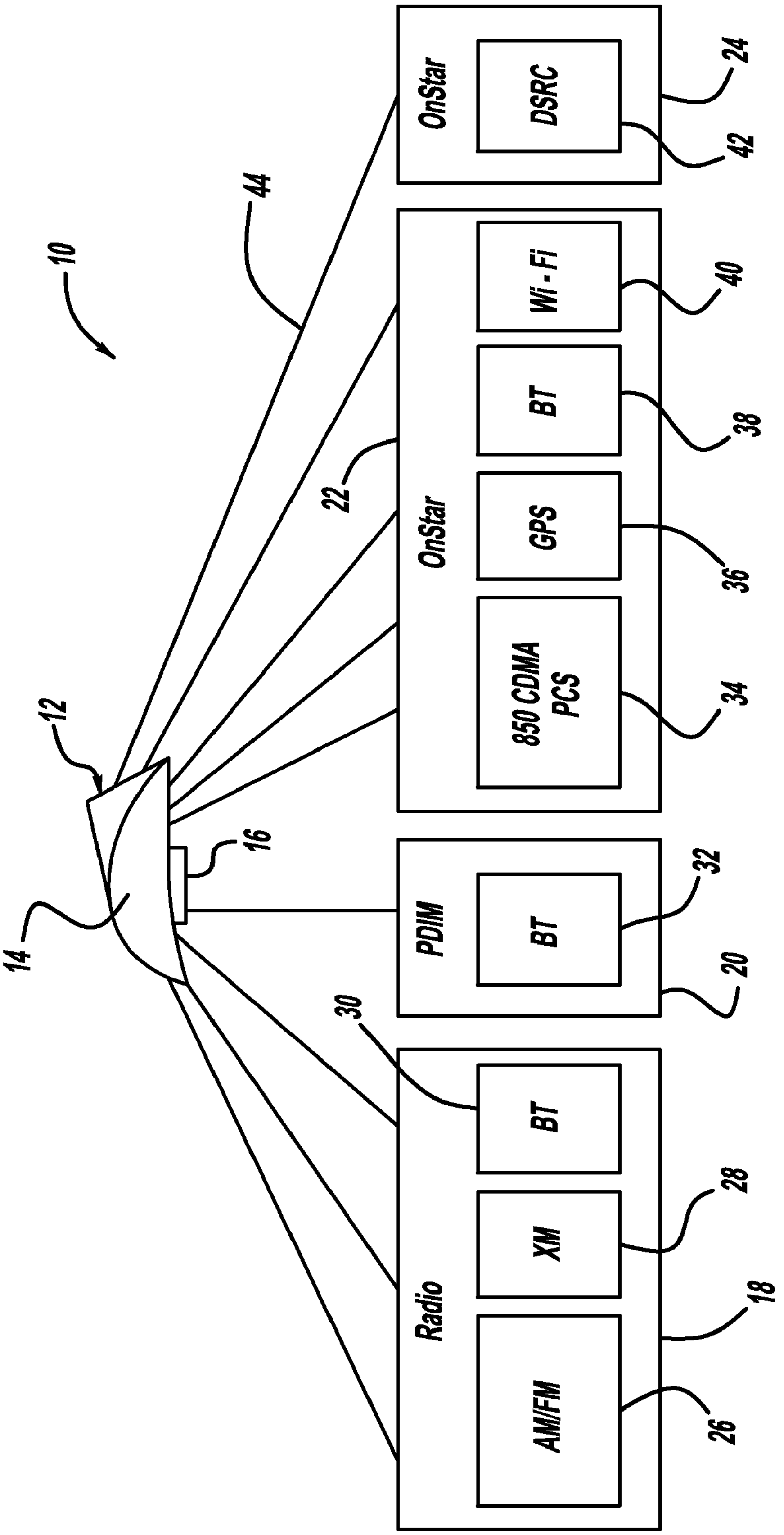
FIG - 1 Prior Art
FIG. 1 is a block diagram of a known vehicle antenna and transceiver system.

FIG. 1 is a block diagram of a known communications architecture 10 for a vehicle. The communications architecture 10 includes an antenna chassis 12 having a radome 14 covering an antenna board 16. The antenna board 16 includes a plurality of antenna radiating elements (not shown), one for each separate reception frequency necessary for the wireless applications in the vehicle. The various frequency applications are represented by different modules including a radio module 18, a personal device interface module (PDIM) 20, a first Onstar™ module 22 and a second Onstar™ module 24. The radio module 18 includes an AM/FM transceiver 26, an XM transceiver 28 and a Bluetooth transceiver 30. The PDIM 20 includes a Bluetooth transceiver 32. The first Onstar™ module 22 includes an 850 MHz CDMA and 1.9 GHz personal communication services (PCS) transceiver 34, a GPS transceiver 36, a Bluetooth transceiver 38 and a WiFi transceiver 40. The second Onstar™ module 26 includes a DSRC transceiver 42. Some of these transceivers may not exist on current production vehicles, but may be introduced for production in the near future. The operation and configuration of transceivers of this type are well known to those skilled in the art.

As discussed above, the various transceivers would be distributed throughout the vehicle at any suitable or desirable location depending on the particular vehicle design. Further, as discussed above, the various radiating elements within the antenna chassis 12 are connected to the transceivers 26-38 by separate coaxial cables 44.

Figure 2:
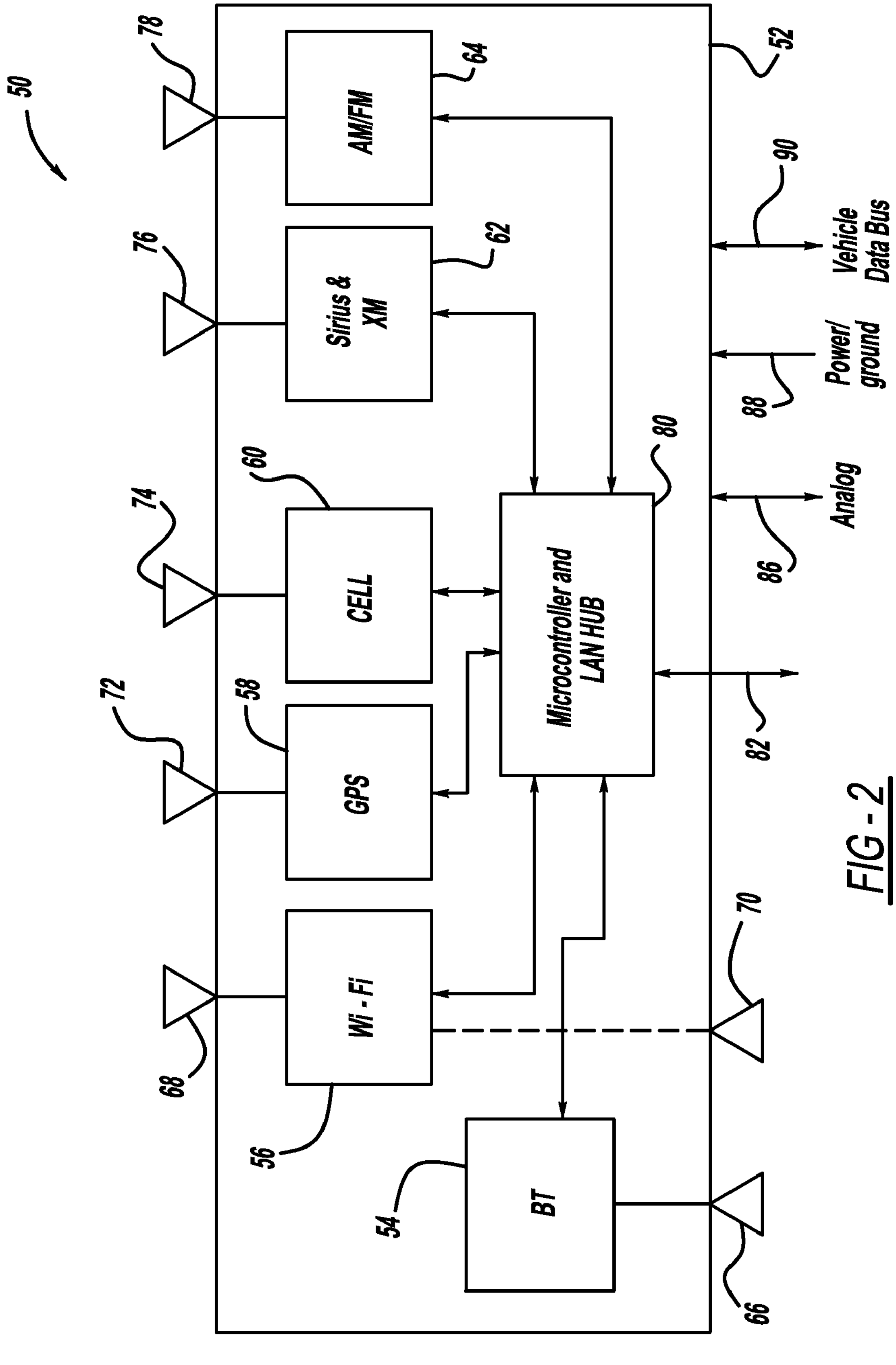
FIG. 2 is a block diagram of an integrated wireless antenna/transceiver module.

FIG. 2 is a schematic plan view of an integrated wireless antenna/transceiver module 50 that integrates antenna radiating elements and transceivers into a single module so as to eliminate the external coaxial cables required to connect them. The module 50 includes a circuit board 52 on which the antenna elements and transceivers are fabricated. In this non-limiting embodiment, the module 50 includes a Bluetooth transceiver 54, a WiFi transceiver 56, a GPS transceiver 58, a cellular telephone transceiver 60, a satellite radio transceiver 62 and a terrestrial radio transceiver 64 all fabricated on the circuit board 52 in any suitable manner, as would be well understood to those skilled in the art. Other embodiments may include less or more transceivers (e.g., DSRC) and also different transceivers. Further, the module 50 is modular in the respect that the transceivers 54-64 can be swapped with other transceivers so that different regions that may require different frequencies can use different transceivers. For example, the US and Europe may use different cellular telephone frequencies where the transceiver 60 can be replaced with other cellular telephone transceivers.

The Bluetooth transceiver 54 receives and transmits signals on a circuit board trace through an antenna radiating element 66, the WiFi transceiver 56 receives and transmits signals on a circuit board trace through radiating antenna radiating elements 68 and 70, the GPS transceiver 58 receives and transmits signals on a circuit board trace through an antenna radiating element 72, the cellular telephone transceiver 60 receives and transmits signals on a circuit board trace through an antenna radiating element 74, the satellite radio transceiver 62 receives and transmits signals on a circuit board trace through an antenna radiating element 76 and the terrestrial radio transceiver 64 receives and transmits signals on a circuit board trace through an antenna radiating element 78. The antenna radiating elements 66-78 can be any radiating elements suitable for the purposes discussed herein, such as patch antenna elements.

A microcontroller and local area network (LAN) hub 80 can be used to control the various radios and to multiplex the signals to be transmitted and received through the transceivers 54-64 from and onto a digital interface 82. The microcontroller and hub 80 does the scheduling for the transceivers 54-64 using any suitable technique that allows all of the signals to be transferred to the desirable location. The digital interface 82 is connected to the various applications in the vehicle where they are operated by the particular user. The particular application will be a user interface and will not include the actual mechanics of the application because that will be performed in the module 50.

Thus, the coaxial cables generally needed to connect the transceivers 54-64 to the radiating elements 66-78 are eliminated. Further, because coaxial cable losses are no longer applicable a comprehended by this invention, the radiating elements 66-78 can be reduced in size over the radiating elements that would be required for the same application that used coaxial cables because the antenna gain can be reduced. Also, the module 50 reduces power amplifier requirements on the transmit side because RF cable losses are eliminated and non-linear issues, such as harmonics, are reduced. Further, on the receive side, low noise amplifier requirements are reduced because of reduced gain requirements and less stability issues.

The module 50 can provide analog input and output signals on line 86 and can be powered by 12 volt power on line 88. Further, signals to the module 50 can be provided to or received from a vehicle data bus on line 90.

In one non-limiting embodiment, the module 50 can be positioned between the headliner and the roof of the vehicle so that a radome of the antenna extends upward.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An antenna/transceiver module comprising:

a circuit board;

a plurality of radiating antenna elements fabricated on the circuit board where the antenna radiating elements each receive and transmit antenna signals at different frequencies; and a plurality of transceivers fabricated on the circuit board where each transceiver is for a different application and a different antenna radiating element is electrically coupled to each transceiver, wherein the plurality of transceivers are modular in that they can be replaced with other transceivers.

2. The module according to claim 1 further comprising a local area network hub that multiplexes signals from the plurality of transceivers onto a digital interface.

3. The module according to claim 1 wherein the plurality of transceivers includes a Bluetooth transceiver.

4. The module according to claim 1 wherein the plurality of transceivers includes a WiFi transceiver.

5. The module according to claim 1 wherein the plurality of transceivers includes a dedicated short range channel transceiver.

6. The module according to claim 1 wherein the plurality of transceivers includes a GPS transceiver.

7. The module according to claim 1 wherein the plurality of transceivers includes a cellular telephone transceiver.

8. The module according to claim 1 wherein the plurality of transceivers includes a satellite radio transceiver.

9. The module according to claim 1 wherein the plurality of transceivers includes a terrestrial radio transceiver.

10. The module according to claim 1 wherein the module is positioned between a roof and a headliner of a vehicle.

11. The module according to claim 1 wherein a vehicle data bus is coupled to the module.

12. An antenna/transceiver module comprising:

a circuit board;

a plurality of radiating antenna elements fabricated on the circuit board where the antenna radiating elements each receive and transmit antenna signals at different frequencies; and a plurality of transceivers fabricated on the circuit board where each transceiver is for a different application and a different antenna radiating element is electrically coupled to each transceiver, wherein the plurality of transceivers include a Bluetooth transceiver, a WiFi transceiver, a dedicated short range channel transceiver, a GPS transceiver, a cellular telephone transceiver, a satellite radio transceiver and a terrestrial radio transceiver, and wherein the plurality of transceivers are modular in that they can be replaced with other transceivers.

13. The module according to claim 12 further comprising a local area network hub that multiplexes signals from the plurality of transceivers onto a digital interface.

14. The module according to claim 12 wherein the module is positioned between a roof and a headliner of a vehicle.

15. The module according to claim 12 wherein a vehicle data bus is coupled to the module.

16. An antenna/transceiver module comprising:

a circuit board;

a plurality of radiating antenna elements fabricated on the circuit board where the antenna radiating elements each receive and transmit antenna signals at different frequencies;

a plurality of transceivers fabricated on the circuit board where each transceiver is for a different application and a different antenna radiating element is electrically coupled to each transceiver and wherein the plurality of transceivers are modular in that they can be replaced with other transceivers; and a local area network hub that multiplexes signals from the plurality of transceivers onto a digital interface, wherein the module is positioned between a roof and a headliner of the vehicle.

17. The module according to claim 16 wherein the plurality of transceivers are selected from the group consisting of Bluetooth transceivers, WiFi transceivers, dedicated short range channel transceivers, GPS transceivers, cellular telephone transceivers, satellite radio transceivers and terrestrial radio transceivers.

* * * * *